United States Patent
Sankar et al.

(10) Patent No.: US 10,032,234 B2
(45) Date of Patent: Jul. 24, 2018

(54) RANKING SEARCH RESULTS USING DIVERSITY GROUPS

(71) Applicant: Facebook, Inc., Menlo Park, CA (US)

(72) Inventors: Sriram Sankar, Palo Alto, CA (US); Sandhya Kunnatur, Mountain View, CA (US); Kedar Dhamdhere, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 796 days.

(21) Appl. No.: 13/752,616

(22) Filed: Jan. 29, 2013

(65) Prior Publication Data

US 2014/0214814 A1 Jul. 31, 2014

(51) Int. Cl.
*G06Q 50/00* (2012.01)
*G06F 17/30* (2006.01)
*G06Q 30/02* (2012.01)

(52) U.S. Cl.
CPC ....... *G06Q 50/01* (2013.01); *G06F 17/30867* (2013.01); *G06Q 30/02* (2013.01); *G06F 17/30958* (2013.01)

(58) Field of Classification Search
CPC .............. G06Q 50/01; G06F 17/30867; G06F 17/30958; G06F 17/3053
See application file for complete search history.

(56) References Cited

U.S. PATENT DOCUMENTS

| | | | | |
|---|---|---|---|---|
| 8,060,497 | B1* | 11/2011 | Zatsman et al. | 707/723 |
| 9,009,147 | B2* | 4/2015 | He | G06F 17/30958 707/728 |
| 9,607,289 | B2* | 3/2017 | Matas | G06Q 10/10 |
| 2004/0193582 | A1* | 9/2004 | Smyth | G06F 17/30533 |
| 2005/0262050 | A1* | 11/2005 | Fagin | G06F 17/30864 |
| 2007/0294225 | A1* | 12/2007 | Radlinski | G06F 17/30867 |
| 2008/0154878 | A1* | 6/2008 | Rose | G06F 17/30867 |
| 2008/0288480 | A1* | 11/2008 | Yahia et al. | 707/5 |
| 2010/0235317 | A1* | 9/2010 | Yu | G06F 17/30864 706/54 |

(Continued)

FOREIGN PATENT DOCUMENTS

WO WO 2010003129 A2 * 1/2010

OTHER PUBLICATIONS

De Choudhury, Munmun, Scott Counts, and Mary Czerwinski. "Find Me the Right Content! Diversity-Based Sampling of Social Media Spaces for Topic-Centric Search." In ICWSM. 2011.*

(Continued)

*Primary Examiner* — Taelor Kim
*Assistant Examiner* — Jesse P Frumkin
(74) *Attorney, Agent, or Firm* — Baker Botts L.L.P.

(57) ABSTRACT

In one embodiment, a method includes receiving a plurality of search results based on a search query from a user. A computing system determines a plurality of scores for each search result, each score generated by applying a distinct scoring function of a plurality of scoring functions to the search result. The computing system generates a plurality of diversity groups, each diversity group corresponding to a scoring function of the plurality of scoring functions, each diversity group including at least a subset of the plurality of search results ordered according to the scores generated by applying the scoring function to the at least the subset of the plurality of search results. The method further includes selecting at least one of the plurality of search results from each diversity group and sending the selected search results to the user.

27 Claims, 5 Drawing Sheets

(56) References Cited

U.S. PATENT DOCUMENTS

| | | | | |
|---|---|---|---|---|
| 2012/0221562 A1* | 8/2012 | Zhang | G06F 17/3053 | 707/728 |
| 2012/0271838 A1* | 10/2012 | Whang | G06F 7/22 | 707/752 |
| 2013/0073568 A1* | 3/2013 | Federov | G06F 17/30867 | 707/749 |
| 2013/0097140 A1* | 4/2013 | Scheel | G06Q 50/01 | 707/706 |
| 2013/0159092 A1* | 6/2013 | Lahaie et al. | | 705/14.45 |
| 2013/0159328 A1* | 6/2013 | McConnell | | 707/756 |
| 2013/0191416 A1* | 7/2013 | Lee | G06F 17/30979 | 707/771 |
| 2013/0218866 A1* | 8/2013 | Qian | G06F 17/30696 | 707/714 |
| 2013/0254206 A1* | 9/2013 | Counts et al. | | 707/738 |
| 2013/0290325 A1* | 10/2013 | Work | G06Q 10/00 | 707/731 |
| 2014/0032563 A1* | 1/2014 | Lassen | G06F 17/30315 | 707/741 |
| 2014/0046965 A1* | 2/2014 | Tian | G06F 17/30648 | 707/749 |
| 2014/0137012 A1* | 5/2014 | Matas | G06F 17/30867 | 715/764 |
| 2014/0172876 A1* | 6/2014 | Rubinstein | G06Q 50/01 | 707/748 |
| 2014/0379708 A1* | 12/2014 | Fox | G06F 17/3053 | 707/728 |
| 2016/0154884 A1* | 6/2016 | Belov | G06F 17/30864 | 707/770 |

OTHER PUBLICATIONS

Alonso, Omar, Michael Gamon, Kevin Haas, and Patrick Pantel. "Diversity and relevance in social search." (2012).*

Krestel, Ralf, and Peter Fankhauser. "Reranking web search results for diversity." Information retrieval 15, No. 5 (2012): 458-477.*

* cited by examiner

RANKING SEARCH RESULTS USING DIVERSITY GROUPS

TECHNICAL FIELD

This disclosure generally relates to improving the quality of search results identified for search queries.

BACKGROUND

The Internet provides a vast amount of information, which may be stored at many different sites and on many different devices, such as on servers and clients or in databases, around the world. These different devices at the different sites are communicatively linked to computer or communication networks over wire-line or wireless connections. A person may access specific pieces of information available on the Internet using a suitable network device (e.g., a computer, a smart mobile telephone, etc.) connected to a network.

Due to the sheer amount of information available on the Internet, it is impractical as well as impossible for a person (e.g., a network user) to manually search throughout the Internet for the specific pieces of information he needs. Instead, most network users rely on different types of computer-implemented tools to help them locate the desired information. One of the most commonly and widely used computer-implemented tools is a search tool, also referred to as a search engine. To search for information relating to a specific topic on the Internet, a user typically provides a few words, often referred to as a "search query" describing the topic to a search tool. The search tool conducts a search based on the search query using various search algorithms and generates a set of search results, each corresponding to some information that is likely to be related to the search query. The search results are then presented to the user.

Sophisticated search tools implement many functionalities to better identify relevant search results. For example, a search tool may search an index of documents or items according to one or more search algorithms in order to generate a set of search results in response to a search query. The index of documents or items, also called a search index, may be ranked in a particular order (e.g., most important to least important) that may be independent of any search query. There are continuous efforts to improve the quality of search results generated by search tools.

SUMMARY OF PARTICULAR EMBODIMENTS

Particular embodiments of this disclosure are directed to ranking search results using diversity groups. In a particular embodiment, a search query is executed using one or more search indices. A plurality of search results are identified based on the search query. These search results are passed to a diversity scorer which applies multiple different scoring functions to the search results. Each scoring function may be based on different criteria or may weight particular criteria differently than other scoring functions. The search results are then organized into diversity groups. Each diversity group corresponds to one of the scoring functions and includes a ranked set of the search results based on the score the search result received from the scoring function. Using a selection function, a specified number of search results from each diversity group are identified and placed into a set of final results. The final results are then sent to the user for viewing.

Such embodiments may allow a search-engine system to identify diverse search results for a user that submits a search query. For example, certain search algorithms may apply the same criteria to nodes of a search index to determine the results presented to the user. However, such algorithms may fail to return (or properly rank) relevant results that do not fit the characteristics prioritized by the algorithms. As an example, if a user searches node of a social network for "Brown," a search algorithm may return many people having the last name of Brown if it is tuned to prioritize users of the social network. However, such an algorithm may fail to return Brown University or a location near the user such as an entity named Brown's Dry Cleaning in the top results. Various embodiments of the present disclosure use multiple scoring functions to rank search results within multiple groups and places the top search results from each group into the final results viewed by the user. Accordingly, the most relevant search results are more likely to be presented to the user.

Certain embodiments of the present disclosure may provide one or more technical advantages. A technical advantage of one embodiment includes providing diverse search results to a user. Another technical advantage of one embodiment includes limiting the bandwidth used between a user and a search-engine system by providing optimized search results that decrease the number of additional searches performed by the user to identify the desired search results. Another technical advantage of one embodiment includes sorting the search results into heaps that each correspond to a different scoring function such that the top search results from the heaps may be quickly placed into a set of search results sent to a user.

Certain embodiments of the present disclosure may include none, some, or all of the above technical advantages. One or more other technical advantages may be readily apparent to one skilled in the art in view of the figures, descriptions, and claims of the present disclosure.

DESCRIPTION OF EXAMPLE EMBODIMENTS

Figure 1:
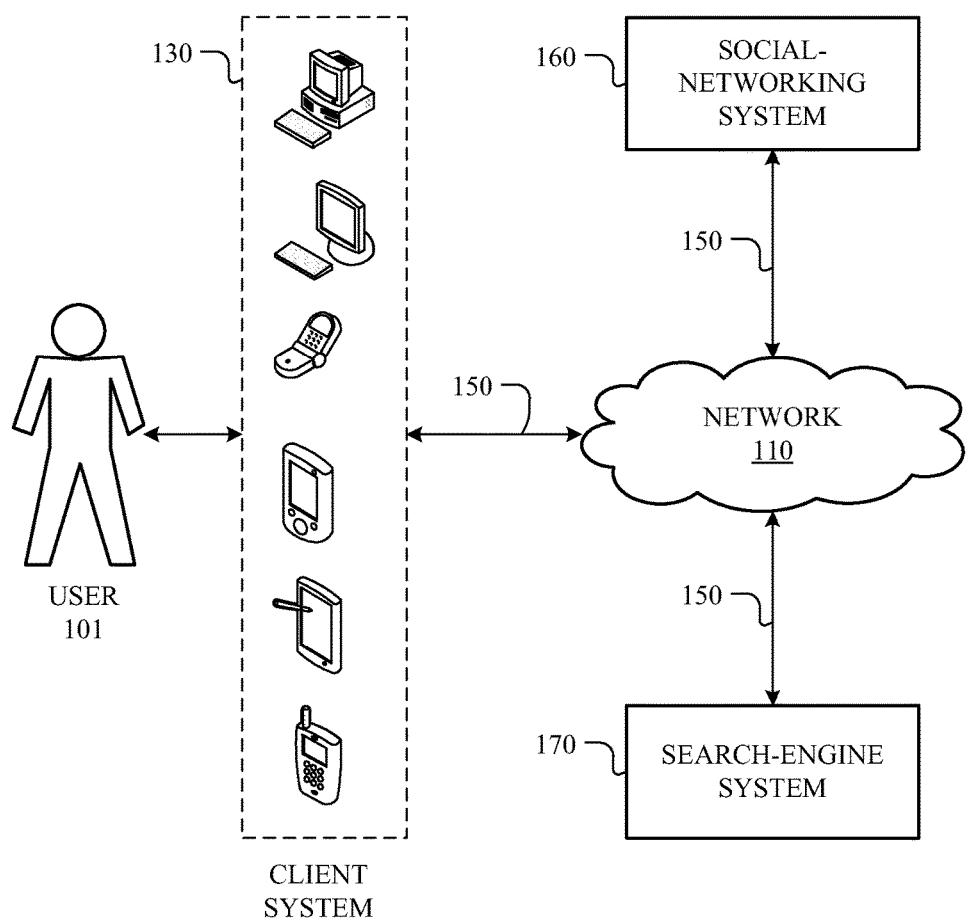
FIG. 1 illustrates an example network environment associated with a social-networking system.

FIG. 1 illustrates an example network environment 100 associated with a social-networking system 160. Network environment 100 includes a user 101, a client system 130, a social-networking system 160, and a search-engine system 170 connected to each other by a network 110. Although FIG. 1 illustrates a particular arrangement of user 101, client system 130, social-networking system 160, search-engine system 170, and network 110, this disclosure contemplates any suitable arrangement of user 101, client system 130, social-networking system 160, search-engine system 170, and network 110. As an example and not by way of limitation, two or more of client system 130, social-networking system 160, and search-engine system 170 may be connected to each other directly, bypassing network 110. As another example, two or more of client system 130, social-networking system 160, and search-engine system 170 may be physically or logically co-located with each other in whole or in part. Moreover, although FIG. 1 illustrates a particular number of users 101, client systems 130, social-networking systems 160, search-engine systems 170, and networks 110, this disclosure contemplates any suitable number of users 101, client systems 130, social-networking systems 160, search-engine systems 170, and networks 110. As an example and not by way of limitation, network environment 100 may include multiple users 101, client systems 130, social-networking systems 160, search-engine systems 170, and networks 110.

In particular embodiments, user 101 may be an individual (human user), an entity (e.g. an enterprise, business, or third-party application), or a group (e.g. of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g. search-engine systems 170), such as, for example, by setting appropriate privacy settings.

A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have utilized resources available through the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, organize events, etc. In particular embodiments, entities of a social network (including, for example, individuals, organizations, locations, or events) may have associated web pages within a social-networking website. Each of these web pages may contain information related to its associated entity. For example, a web page for a user of the social network, which may be referred to as a user profile page, may contain information about the user including, for example photographs of the user, information about the user's interests, or the user's academic or professional background. Similarly, the profile page for an event, a location, or an organization may contain information about the event (e.g., invitees, time, and place of the event), the location (e.g., pictures of the location or a map of the location), or the organization (e.g., information about the organization and its members or the contact information of the organization). The profile page for a user or other entity may be accessible to other users or entities of the social network depending, for example, on privacy settings for the profile page. For example, the social network may allow users to post information or messages (such as, for example, user status, comments, photographs, or multimedia files) known as "posts" on another user or entity's profile page in a section of the page known as a "wall." In particular embodiments, the wall of a profile page of an entity may be a pre-determined section of a profile page that is accessible to other entities of the social network. In particular embodiments, the wall of a profile page may be organized in a dynamically arranged, chronological manner, and this type of wall may be referred to as a "timeline" for an entity of the social network.

Figure 2:
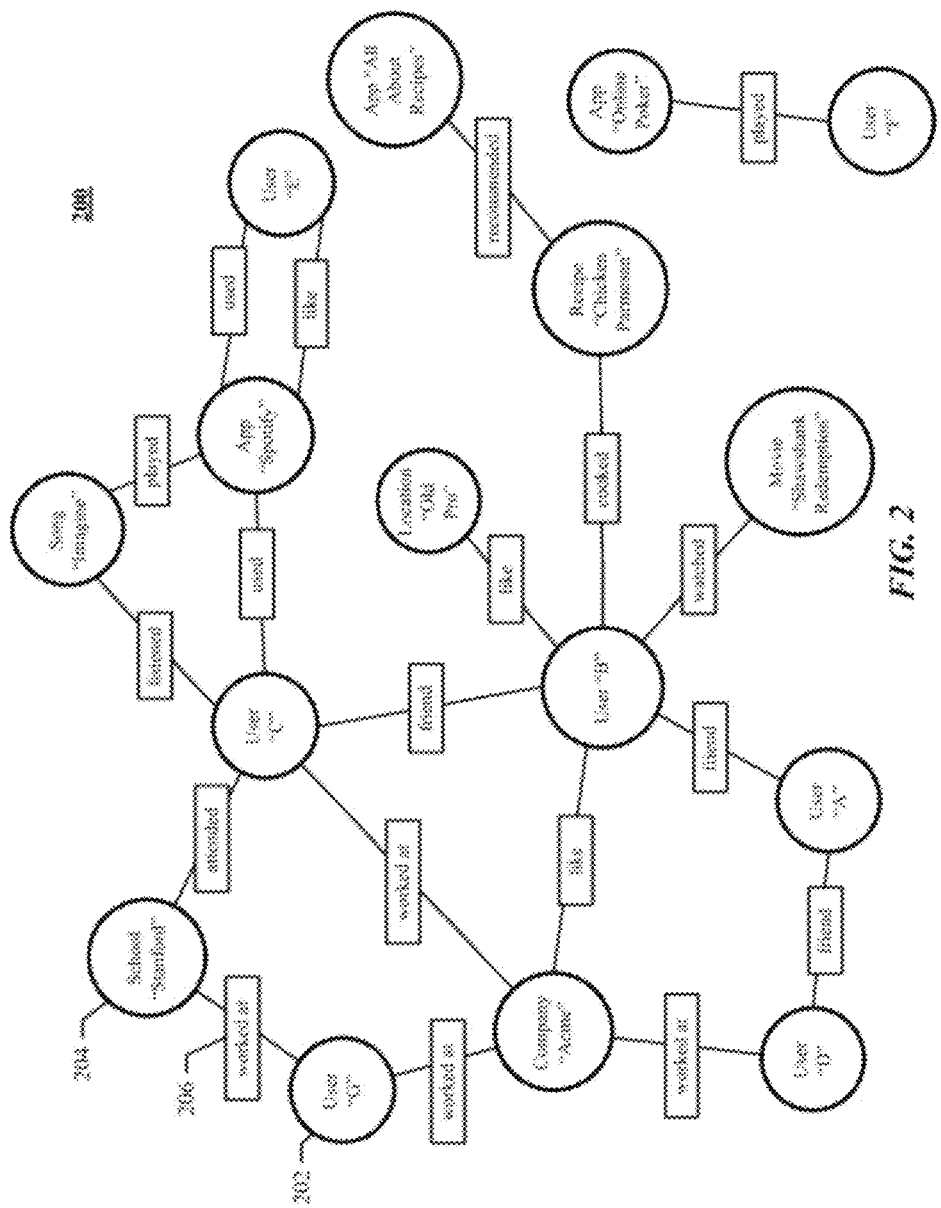
FIG. 2 illustrates an example social graph.

A social-networking system may contain a vast amount of information related to its users. Such information is not limited to the social connections of the individual users, but may include, for example and without limitation, demographical information, network or social activities, behavior profiles, and personal preferences, interests, or hobbies of the individual users. Particular embodiments may represent the information contained in a social-networking system using a social graph that may have any number of nodes and edges, an example of which is illustrated in FIG. 2.

In particular embodiments, search-engine system 170 may be a network-addressable computing system that can host an online search engine. Search-engine system 170 may generate, store, receive, and send search-related data, such as, for example, search queries, search results, and other suitable search-related data. As an example and not by way of limitation, search-engine system 170 may implement one or more search algorithms to identify network resources in response to search queries received at search-engine system 170, one or more scoring algorithms or ranking algorithms to score and/or rank identified network resources, or one or more summarization algorithms to summarize identified network resources. In particular embodiments, a scoring algorithm implemented by search-engine system 170 may use a machine-learned scoring formula, which the scoring algorithm may obtain automatically from a set of training data constructed from pairs of search queries and selected Uniform Resource Locators (URLs), where appropriate.

Search-engine system 170 may be accessed by the other components of network environment 100 either directly or via network 110. In particular embodiments, one or more users 101 may use one or more client systems 130 to access, send data to, and receive data from social-networking system 160 or search-engine system 170. Client system 130 may access social-networking system 160 or search-engine system 170 directly, via network 110, or via a third-party system. As an example and not by way of limitation, client system 130 may access search-engine system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and search-engine system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to send to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 3:
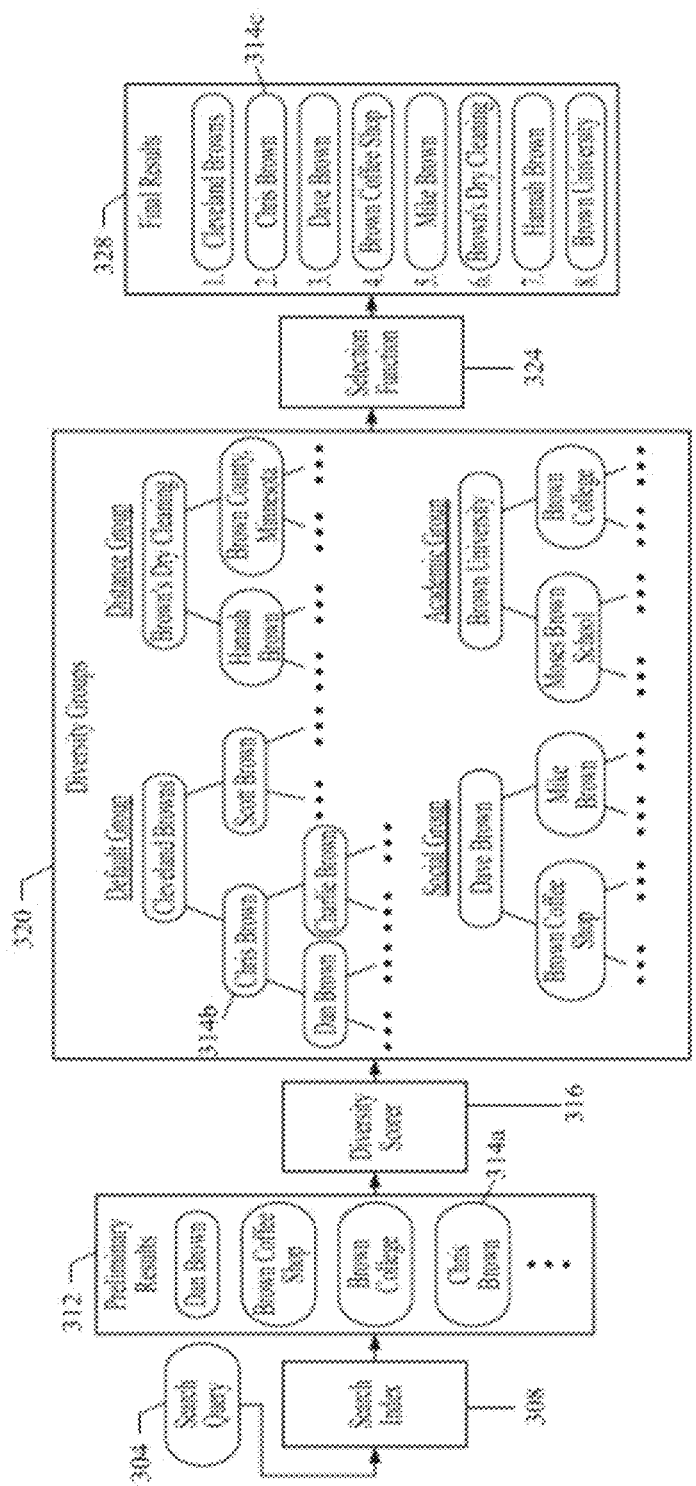
FIG. 3 illustrates an example flow for ranking and selecting search results for a search query.

FIG. 3 illustrates an example flow for ranking and selecting search results for a search query 304. Any of the steps associated with the flow may be performed by social-networking system 160, search-engine system 170, other suitable components, or a combination thereof. Similarly, any of the data associated with the flow may be generated or stored by social-networking system 160, search-engine system 170, or other suitable components.

In particular embodiments, a computer-implemented search tool implemented by social-networking system 160, search-engine system 170, other suitable components, or a combination thereof is designed to search for information relevant to specific topics (e.g., people, places, content, or resources) on one or more networks (such as the Internet or an intranet) or databases. To conduct a search, a network user 101 may issue a search query 304 to the search tool. The search query 304 generally contains one or more words or other terms that describe a topic. In response, the search tool may identify a preliminary result set 312 that includes a set of search results 314a. The search tool may search one or more search indices 308 according to one or more search algorithms in order to generate the preliminary search result set 312. The search results 314a each correspond to a search node included in the one or more search indices 308.

Search index 308 represents one or more search indices that include search nodes representing documents, webpages, media files, applications, or other items. In particular embodiments, some or all of the search nodes of search index 308 correspond to nodes of social graph 200 of social-networking system 160. For example, a search node of search index 308 may correspond to a user node 202 or a concept node 204. The search index 308 may also include information regarding relationships between the nodes (e.g., edges in the social graph 200 connecting the nodes). Thus, in particular embodiments, a search tool may be provided by or associated with social-networking system 160 to enables its users to search for information relating to specific topics in a social context. The information represented by social graph 200 may be used to help identify and rank items (e.g., nodes in social graph 200) in the search indices 308 of the social-networking system. In order to provide better search results, the search index 308 of documents or items, may be ranked in a particular order (e.g., most important to least important) that may be independent of any search query. Existing search engines (e.g., search engines provided by Google, Microsoft, or Yahoo) may rank search results based mainly on content relevance but may not take into consideration social context or social information relevant to any social-networking system. Instead or in addition to content relevance, particular embodiments may take into consideration the social information available to the social-networking system (e.g., in the form of social graph 200) providing or associated with the search tool when ranking items in the search indices.

In particular embodiments, a search index 308 may include search nodes of a single type, such as music files, and another search index 308 may include search nodes of a different type, such as webpages, and so on. In other embodiments, a search index 308 may include search nodes of various types. Search index 308 may utilize any suitable data structure to store search nodes and associated information, such as a suffix tree, inverted index, citation index, n-gram index, document-term matrix, forward index, or other suitable data structure. In particular embodiments, a search index includes a list of terms on which searches may be performed and a mapping from the terms to the search nodes that may be used to provide results based on a search.

Search query 304 may be sent to one or more search indices 308 and one or more search algorithms may determine a preliminary set 312 of search results 314a based on the search query 304 and the search nodes of the search indices 308. A search algorithm is an algorithm for finding an item with specified properties among a collection of items. The set 312 may be determined in any suitable manner and may have any suitable number of search results 314a. For example, the search results 314a may correspond to search nodes that include or are associated with one or more terms of the search query 304 or one or more terms synonymous with those terms. As another example, one or more search results 314a may correspond to search nodes that have an association with one or more of these search nodes. In particular embodiments, the search tool may determine a predetermined number (e.g., the top N results) of search results that satisfy the requirements of search query 304 by choosing the top N statically ranked (i.e., the ranking of the search results independent of any search query) items in search index 308. In other particular embodiments, the search tool may also or alternatively take into account any other suitable information such as social graph information or information about the user (e.g., search history or profile information) in determining preliminary result set 312.

After the preliminary result set 312 is determined, a diversity scorer 316 applies multiple scoring functions to the search results 314a. For example, a first scoring function may be applied to a first search result 314a to generate a first score, a second scoring function may be applied to the first search result 314a generate a second score, a third scoring function may be applied to the first search result 314a to generate a third score, and so on. Any suitable number of scoring functions may be applied to a search result. The scoring functions are used to rank the search results 314a along different dimensions in order to provide diverse search results to user 101.

Any number of suitable scoring functions may be used by diversity scorer 316. As an example, a default scoring function may be used to determine a general score for a search result 314a based on any suitable factors such as the correlation between the terms of the search query 304 and terms of the search result, the popularity of the user or entity corresponding to the search result 314a (e.g., the number of visits made to a corresponding webpage or profile page or how many users checked in at, liked, or shared the webpage or profile page), a size associated with the search result (e.g., the population of a geographical entity such as a city or the number of employees of a business), the geographical proximity between a location associated with the user 101 and a location associated with the search result 314a, social graph information (e.g., search results corresponding to friends or friends of friends of the user 101 or users that are associated with a group of the user 101 in social-networking system 160 may be scored higher), any of the factors discussed below in connection with other scoring functions, or any other suitable factors. For any particular scoring function, the factors used in determining the score may have any suitable weighting.

As another example, a social scoring function may be used to determine a social score for the search result 314a based on any suitable social factors such as the number and types of edges connected to the corresponding node of social graph 200, time stamps associated with the edges connected to the node, the number of times user 101 has checked into an entity associated with the search result, whether the user 101 or the user's friends have liked an entity associated with the search result, the number of mutual friends between a user corresponding to the search result and user 101, or any other social criteria.

As another example, a distance scoring function may be used to determine a distance score for the search result 314a based on the geographic proximity between one or more locations associated with user 101 and one or more locations associated with the search result 314a. Any suitable locations may be considered, such as the current location (e.g., a location determined by a (Global Positioning System (GPS) or other location determination service operating or in communication with client system 130), business location, residence location, or other location of the user 101 or search results 314a. As an example, if a first coffee shop is located closer to a user's home than a second coffee shop, the first coffee shop will receive a better distance score. As another example, a dry cleaning store that is closer to the current location of the user 101 may be ranked better than another store located farther away. In particular embodiments, the distance scoring function may take multiple distances into account, such as the distances between the entity and the current location, work location, and home location of the user 101.

As another example, an academic scoring function may be used to determine an academic score for the search result 314a based on any suitable factors such as whether the search result 314a is an academic institution, whether the search query includes terms associated with an academic institution, or other suitable factors.

As other examples, other scoring functions such as a music scoring function, a video scoring function, an application scoring function, a photo scoring function, a location scoring function, a business scoring function, an event scoring function, a group scoring function, a post scoring function, or other suitable scoring functions may be applied. Each scoring function may implement one or more scoring algorithms configured to provide higher scores to results relevant to the particular category (e.g., music, videos, applications, etc.) of the scoring function. For example, the music scoring function is configured to rate search results corresponding to songs higher than search results corresponding to businesses. The scoring functions may take into account any suitable factors such as a date associated with the corresponding search node (e.g., an upload or capture date of an image or video), the category of the search node, the number of "likes" the node has received, the number of "comments" the node has received, the number of times the node has been shared, the number of times the node has been downloaded, the number of wall or timeline posts that the node has, or other suitable factors.

In particular embodiments, two or more of the scoring functions may utilize at least some common criteria to generate scores but may weight the criteria differently. For example, both the default scoring function and the social scoring function may utilize social criteria in calculating scores for search results, but the social scoring function may assign a higher weight to the social criteria than the default scoring function does. In particular embodiments, any number of each type of scoring function may be utilized, wherein each instance of the type of scoring function is based on a different set of factors. For example, two social scoring functions may be utilized, wherein the first social scoring function is based on two factors (the number of times that a user's friends have checked into or liked an entity associated with the search result), and the second social scoring function is based on one factor (the number of mutual friends between a user corresponding to the search result and user who submitted the search query).

The particular scoring functions that are applied to the preliminary search result set 312 may be determined in any suitable manner. For example, the scoring functions may be selected based on the search query 304, the search results 312, other suitable factors, or a combination thereof. As an example, if a search query includes the term "university," the academic scoring function may be selected as one of the scoring functions. As another example, if preliminary result set 312 includes at least a predetermined number or ratio of search results of a particular category (e.g., songs), a scoring function associated with that category (e.g., the music scoring function) may be selected to be applied to the result set 312. In particular embodiments, the default scoring function is always selected as one of the scoring functions. In particular embodiments, the scoring functions applied to the search results may be fixed or may vary from search to search. For example, in the embodiment depicted, the default scoring function, distance scoring function, social scoring function, and academic scoring function have been selected to be applied to the preliminary search result set 312. A different search query may result in the default scoring function, the music scoring function, and the application scoring function being applied to the search results obtained for the search query.

The scoring functions selected to be applied to preliminary result set 312 may be applied to any suitable search results 314a from result set 312. In a particular embodiment, each selected scoring function is applied to each search result 314a. In other embodiments, one or more of the selected scoring functions are only applied to a subset of search results 314a of preliminary search result set 312. For example, in some embodiments, the photo scoring function may only be applied to search results that correspond to photos or the video scoring function may only be applied to search results that correspond to videos. As another example, the distance scoring function may not score search results that are not associated with any locations.

After the preliminary search results are scored by diversity scorer 316, the search results 314a are used to form diversity groups 320. Each diversity group corresponds to a scoring function. For example, in the embodiment depicted, the default group corresponds to the default scoring function, the distance group corresponds to the distance scoring function, the social group corresponds to the social scoring function, and the academic group corresponds to the academic scoring function. Each diversity group may include at least a subset of the search results 314a that received a score from the scoring function corresponding to the diversity group. The diversity groups each include search results 314b that are ranked according to their scores. For example, the default group includes search results 314b ranked according to their scores received from the default scoring function, the distance group includes search results 314b ranked according to their scores received from the distance function, and so on. If a search result 314b was scored by multiple scoring functions, the search result may be placed into multiple diversity groups. For example, the search result Brown Coffee Shop depicted in the social group may also be included in the distance group (e.g., further down in the diagram since it may be located further from the user 101 than the search results depicted).

The diversity groups may have any suitable structure. In particular embodiments, each diversity group includes a heap. A heap is a structure in which the relationship between each child node and its parent node is the same. For example, in a max heap, each child node has a lower score than its parent node. As another example, in a min heap, each childe node has a higher score than its parent node. The heap may have a root node that represents the node with the highest score if the heap is a max heap or the lowest score if the heap is a min heap. The root node may be easily removed and a new root node designated. The structure of the heap is suitable for selecting search results due to the speed with which the best results may be obtained. Either max heaps or min heaps may be used to store the search results 314b of each diversity group based on whether diversity scorer 316 assigns high or low scores to the best search results. In other embodiments, the diversity groups may comprise other suitable structures, such as sorted lists, arrays, or other data structures.

In particular embodiments, a diversity group may include all of the search results 314a that were scored by the corresponding scoring function. For example, the distance group may include each search result that received a score from the distance scoring function. In other embodiments, only a subset of the search results 314a that received scores from the corresponding scoring function are placed in the diversity group in order to speed up the sorting of the search results of the diversity group. For example, all search results with a score below a predetermined threshold may be excluded from the diversity group.

In the embodiment depicted, the search results 314b of each diversity group is arranged in a max heap. For example, in the default group, search result Cleveland Browns is the root node of the max heap and includes two children nodes Chris Brown and Scott Brown that each include one or more children nodes. In the embodiment depicted, the search result Cleveland Browns received the largest score from the default scoring function and its child node Chris Brown received the second-highest score from the default scoring function.

After the diversity groups are formed, one or more search results 314b are selected from each diversity group to form the final search results 328. In particular embodiments, the search results 314b of the diversity groups may be quickly removed from heaps of the diversity groups and placed into final results 328. For example, when a search result 314b from the default group is selected for inclusion in the final results 328, the root node of the max heap (Cleveland Browns) may be removed from the max heap and placed into final results 328. The second-highest search result of the heap (Chris Brown) may then become the root node of the max heap and will be the next node placed into final results 328 if another search result from the default group is selected for inclusion in final results 328. This process may continue until the specified number of search results from the default group has been placed into the final results 328. A similar process may be performed for each diversity group.

The search results 314c of final results 328 are selected from the diversity groups based on selection function 324. Selection function 324 may specify one or more amounts of search results 314c to be included in the final results 328. For example, selection function 324 may specify the total number of search results that are sent to user 101, the number of search results that are initially displayed to the user 101, a different number of search results, or any combination thereof Selection function 324 may specify the number of search results 314b from each diversity group to be included in the final results 328 or a subset thereof. For example, in the embodiment depicted, selection function 324 may specify that two search results of the default group, two search results of the distance group, three search results of the social group, and one search result of the academic group be included in the final results 328. Selection function 324 may specify any suitable number for any of the diversity groups based on any suitable criteria (e.g., the search query 304, the preliminary result set 312, diversity groups 320, or other suitable criteria).

In another embodiment, selection function 324 may specify the number of search results 314b to include in final results 328 (or a subset thereof) and the minimum number of search results 314b that should be included in final results 328 (or a subset thereof) from each diversity group except for one of the diversity groups. After the results from each other diversity group are included in the final results 328 (or the subset), the remaining results are taken from the diversity group that did not have a specified number of search results. For example, in the embodiment depicted, the selection function may specify that eight results should be included in a subset of final results 328 and that the subset of final results 328 should include at least two results from the distance group, at least three results of the social group, and at least one result of the academic group. Once the specified number of results are included from each of these groups, the remaining search results 314c are taken from the default group. In particular embodiments, the selection function 324 may specify the maximum number of search results 314c that may be included in the final results 328 from one or more of the diversity groups.

Because a single search result 314a may be included in multiple diversity groups, selection function 324 may be operable to deduplicate search results selected for inclusion in final results 328. For example, if Brown's Dry Cleaning had received the highest score among search results in the social group as well as the distance group, only one instance of Brown's Dry Cleaning would be included in final results 328. The selection function 324 may specify that the deduplicated search result should count as a search result included for both diversity groups or it may specify an algorithm for determining which diversity group the search result should be counted against. Thus, in this hypothetical, Brown's Dry Cleaning could be counted as coming from the distance group, the social group, or both the distance group and the social group for the purpose of determining whether the constraints specified by selection function 324 have been satisfied.

The selection function 324 may also specify how the search results from the various diversity groups 320 should be ordered within final results 328. In particular embodiments, the selection function 324 may specify the priority of diversity groups within final results 328. For example, in the embodiment depicted, the selection function 324 may specify that search results from the default group should be listed first, search results from the social group should be listed second, search results from the distance group should be listed third, and search results from the academic group should be listed fourth. Search results from each diversity group may be ordered based on the scores they received from the corresponding scoring function. In other embodiments, selection function 324 may specify that search results 314c should be ordered according to the score they received from their respective scoring function. For example, if Cleveland Browns received a score of 93.5 from the default scoring function, Chris Brown received a score of 82.7 from the default scoring function, and Dave Brown received a score of 89.3 from the social scoring function, Cleveland Browns would be listed first, Dave Brown would be listed second, and Chris Brown would be listed third. Any suitable ordering for final results 328 may be specified by selection function 324.

After formation of the final search result set 328, the final search results 328 are sent for presentation to the user 101. The search results may be presented to the user in any suitable manner. For example, the final search results 328 may be presented to the user 101 in the form of a list of links (or other suitable references) on a search-results webpage, each link being associated with a different webpage that contains at least some information associated with the search result 314c. In particular embodiments, each link in the search results may be in the form of a Uniform Resource Locator (URL) that specifies where a corresponding webpage is located and the mechanism for retrieving it. The user may then be able to click on the URL links to view the specific resources contained in the corresponding webpages.

Figure 4:
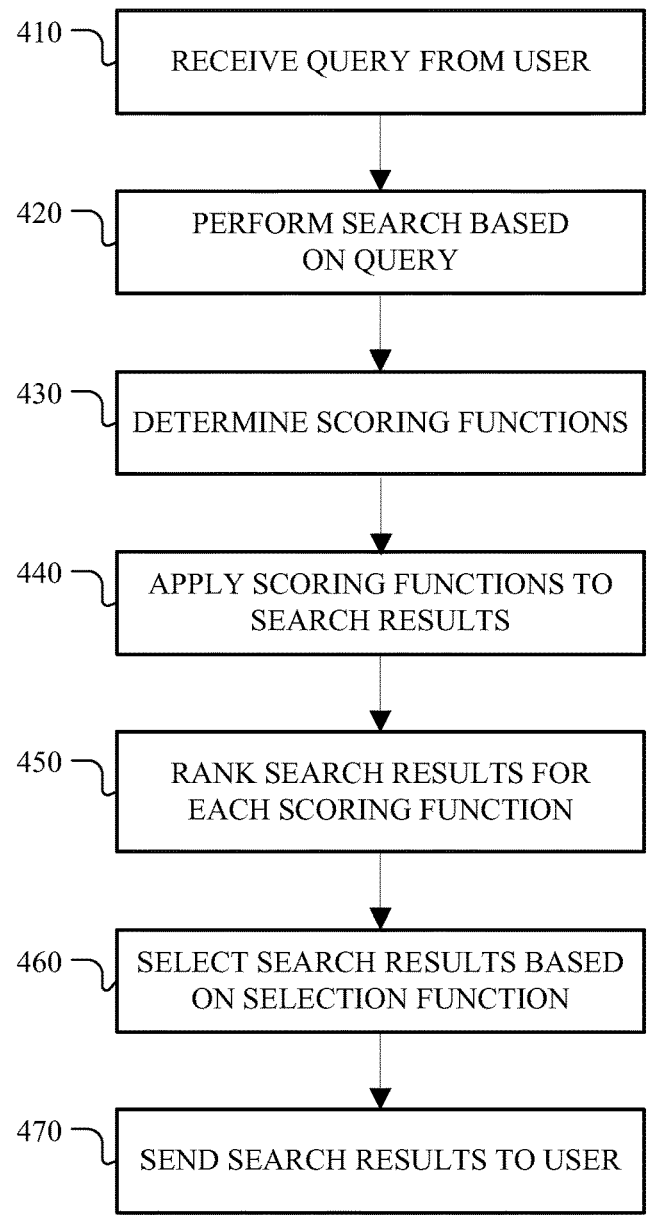
FIG. 4 illustrates an example method of ranking and selecting search results for a search query.

FIG. 4 illustrates an example method of ranking and selecting search results for a search query. The method may begin at step 410, where a search query is received from a user. For example, search query 304 may be received from user 101. The search query may include one or more terms or other search constraints. User 101 may enter the query into client system 130 and transmit the search query to search-engine system 170 over network 110. At step 420, a search is performed based on the search query. For example, the search query may be passed to one or more search indices 308 and the search indices may return a plurality of search results 314a based on the search query 304. At step

430, a set of scoring functions are determined. The scoring functions may be determined based on any suitable criteria, such as information included in the search query 304, information included in the search results 314*a*, or other suitable information. At step 440, the scoring functions are applied to the search results. Each scoring function may generate a score for each search result that the scoring function is applied to. Particular search results may be scored by multiple scoring functions.

At step 450, the search results are ranked for each scoring function. For example, a diversity group may be created for each scoring function. Each diversity group may contain at least a subset of the search results determined at step 420 ordered according to the score the search results received from the corresponding scoring function. In particular embodiments, the diversity groups each comprise heap data structures. At step 460, the search results are selected based on a selection function. For example, final search results 328 may be selected based on selection function 324. Selection function may specify how many results should be selected from each diversity group. The top results of the diversity groups are then included within the final results 328. At step 470, the search results are sent to the user and the method ends. For example, final results 328 may be sent to user 101.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
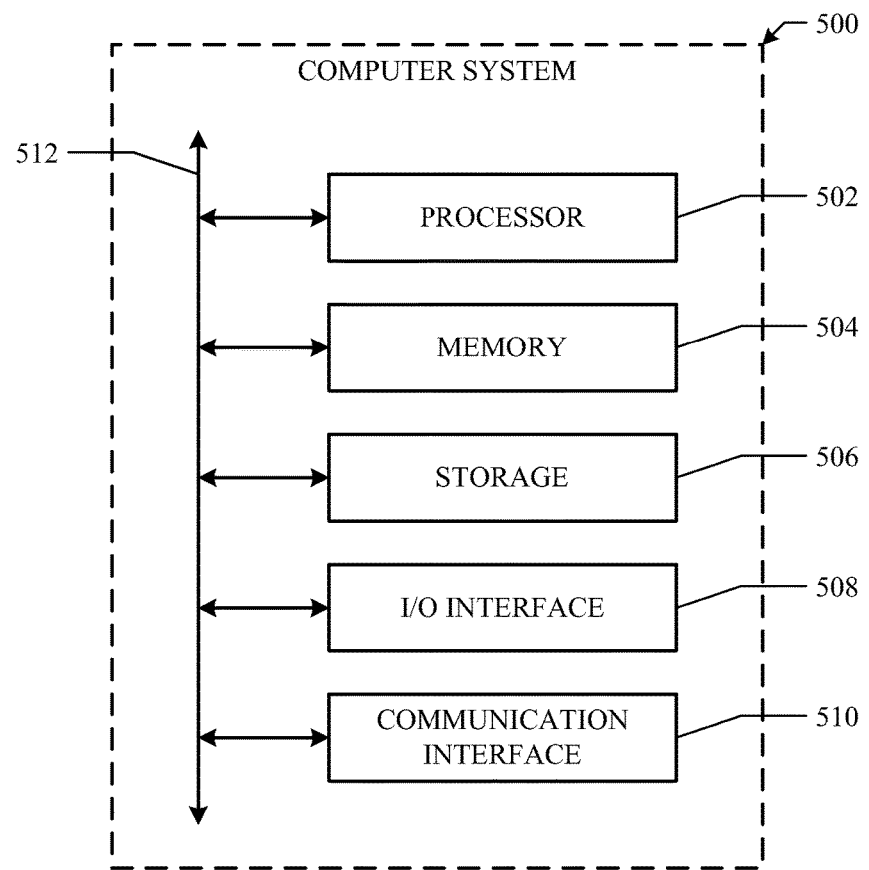
FIG. 5 illustrates an example computer system.

The search tool functionalities described above may be implemented as a series of instructions stored on a computer-readable storage medium that, when executed, cause a programmable processor to implement the operations described above. FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504.

Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing systems:
    accessing, by one or more of the computing systems, a social graph comprising a plurality of nodes and a plurality of edges connecting the nodes, each of the edges between two of the nodes representing a single degree of separation between them;
    identifying, by one or more of the computing systems, a plurality of search results from a plurality of indices based on a search query received from a client device of the first user, each search result corresponding to a node of the social graph, wherein each search result is associated with a plurality of attributes;
    determining, by one or more of the computing systems, for each search result of the plurality of search results, a set of scores for the search result, wherein the set of scores for each search result is determined by:
        selecting a set of scoring functions from a plurality of distinct scoring functions based on attributes of the search query and attributes of the search results; and
        generating the set of scores for the search result from the selected set of scoring functions, respectively, wherein each scoring function applies different weightings to the attributes of the search result and calculates a score for the search result based on the weighted attributes of the search result, wherein the weighting is determined based on a type associated with the scoring function;
    generating, by one or more of the computing systems, a plurality of diversity groups corresponding to the plurality of scoring functions, respectively, each diversity group comprising search results corresponding to nodes indexed by a particular index, wherein the search results of each diversity group are ordered according to the scores generated by applying the respective scoring function to the search results;
    selecting, by one or more of the computing systems, a set of search results, wherein the selected set of search results comprises one or more search results from each diversity group; and
    sending, from one or more of the computing systems, to the client device of the first user for display, a search-results page comprising the selected set of search results.

2. The method of claim 1, wherein each diversity group comprises a max heap of search results and selecting a search result from a diversity group comprises selecting the root node of the max heap.

3. The method of claim 1, wherein each of the one or more search results from each diversity group is selected based on its score within the diversity group.

4. The method of claim 1, further comprising:
    determining that a first search result selected from a first diversity group of the plurality of diversity groups is identical to a second search result selected from a second diversity group of the plurality of diversity groups; and
    selecting a third search result from the second diversity group to be sent to the user in the place of the second search result.

5. The method of claim 1, wherein the one or more search results from each diversity group are selected according to a selection function that specifies the minimum number of search results to select from at least one of the plurality of diversity groups.

6. The method of claim 1, wherein the one or more search results from each diversity group are selected according to a selection function that specifies the maximum number of search results to select from at least one of the plurality of diversity groups.

7. The method of claim 1, wherein the one or more search results from each diversity group are selected according to a selection function that specifies:
    a total number of search results to select;
    the number of search results to select from each of the diversity groups except a first diversity group; and
    that if the total number of search results is not reached after search results have been selected from the diversity groups other than the first diversity group, then additional search results are to be selected from the first diversity group.

8. The method of claim 1, wherein each of one or more of the plurality of scoring functions corresponds to a particular index indexing nodes of a particular node type, wherein the node types comprise user nodes and concept nodes.

9. The method of claim 1, wherein the nodes comprise user nodes and concept nodes, wherein the user nodes correspond to users and the concept nodes correspond to one or more of places, entities, documents, websites, media files, or applications.

10. The method of claim 1, wherein the attributes of the search query and the attributes of the search results are categories associated with the search query and the search results.

11. A system comprising: one or more processors; and a non-transitory memory coupled to the processors comprising instructions executable by the processors, the processors operable when executing the instructions to:
- access, by one or more of the computing systems, a social graph comprising a plurality of nodes and a plurality of edges connecting the nodes, each of the edges between two of the nodes representing a single degree of separation between them;
- identify, by one or more of the computing systems, a plurality of search results from a plurality of indices based on a search query received from a client device of the first user, each search result corresponding to a node of the social graph, wherein each search result is associated with a plurality of attributes;
- determine, by one or more of the computing systems, for each search result of the plurality of search results, a set of scores for the search result, wherein the set of scores for each search result is determined by:
  - selecting a set of scoring functions from a plurality of distinct scoring functions based on attributes of the search query and attributes of the search results; and
  - generating the set of scores for the search result from the selected set of scoring functions, respectively, wherein each scoring function applies different weightings to the attributes of the search result and calculates a score for the search result based on the weighted attributes of the search result, wherein the weighting is determined based on a type associated with the scoring function;
- generate, by one or more of the computing systems, a plurality of diversity groups corresponding to the plurality of scoring functions, respectively, each diversity group comprising search results corresponding to nodes indexed by a particular index, wherein the search results of each diversity group are ordered according to the scores generated by applying the respective scoring function to the search results;
- select, by one or more of the computing systems, a set of search results, wherein the selected set of search results comprises one or more search results from each diversity group; and
- send, from one or more of the computing systems, to the client device of the first user for display, a search-results page comprising the selected set of search results.

12. The system of claim 11, wherein each diversity group comprises a max heap of search results and selecting a search result from a diversity group comprises selecting the root node of the max heap.

13. The system of claim 11, wherein each of the one or more search results from each diversity group based on its score within the diversity group.

14. The system of claim 11, the processor further operable to:
- determine that a first search result selected from a first diversity group of the plurality of diversity groups is identical to a second search result selected from a second diversity group of the plurality of diversity groups; and
- select a third search result from the second diversity group to be sent to the user in the place of the second search result.

15. The system of claim 11, wherein the one or more search results from each diversity group are selected according to a selection function that specifies the minimum number of search results to select from at least one of the plurality of diversity groups.

16. The system of claim 11, wherein the one or more search results from each diversity group are selected according to a selection function that specifies the maximum number of search results to select from at least one of the plurality of diversity groups.

17. The system of claim 11, wherein the one or more search results from each diversity group are selected according to a selection function that specifies:
- a total number of search results to select;
- the number of search results to select from each of the diversity groups except a first diversity group; and
- that if the total number of search results is not reached after search results have been selected from the diversity groups other than the first diversity group, then additional search results are to be selected from the first diversity group.

18. The system of claim 11, wherein each of one or more of the plurality of scoring functions corresponds to a particular index indexing nodes of a particular node type, wherein the node types comprise user nodes and concept nodes.

19. The system of claim 11, wherein the nodes comprise user nodes and concept nodes, wherein the user nodes correspond to users and the concept nodes correspond to one or more of places, entities, documents, websites, media files, or applications.

20. The system of claim 11, wherein the attributes of the search query and the attributes of the search results are categories associated with the search query and the search results.

21. One or more non-transitory computer readable media comprising logic operable to:
- access, by one or more of the computing systems, a social graph comprising a plurality of nodes and a plurality of edges connecting the nodes, each of the edges between two of the nodes representing a single degree of separation between them;
- identify, by one or more of the computing systems, a plurality of search results from a plurality of indices based on a search query received from a client device of the first user, each search result corresponding to a node of the social graph, wherein each search result is associated with a plurality of attributes;
- determine, by one or more of the computing systems, for each search result of the plurality of search results, a set of scores for the search result, wherein the set of scores for each search result is determined by:
  - selecting a set of scoring functions from a plurality of distinct scoring functions based on attributes of the search query and attributes of the search results; and
  - generating the set of scores for the search result from the selected set of scoring functions, respectively, wherein each scoring function applies different weightings to the attributes of the search result and calculates a score for the search result based on the weighted attributes of the search result, wherein the weighting is determined based on a type associated with the scoring function;
- generate, by one or more of the computing systems, a plurality of diversity groups corresponding to the plurality of scoring functions, respectively, each diversity group comprising search results corresponding to nodes indexed by a particular index, wherein the search results of each diversity group are ordered according to the scores generated by applying the respective scoring function to the search results;

select, by one or more of the computing systems, a set of search results, wherein the selected set of search results comprises one or more search results from each diversity group; and sending, from one or more of the computing systems, to the client device of the first user for display, a search-results page comprising the selected set of search results.

22. The media of claim 21, wherein each diversity group comprises a max heap of search results and selecting a search result from a diversity group comprises selecting the root node of the max heap.

23. The media of claim 21, wherein each of the one or more search results from each diversity group based on its score within the diversity group.

24. The media of claim 21, the logic further operable to:
determine that a first search result selected from a first diversity group of the plurality of diversity groups is identical to a second search result selected from a second diversity group of the plurality of diversity groups; and select a third search result from the second diversity group to be sent to the user in the place of the second search result.

25. The media of claim 21, wherein each of one or more of the plurality of scoring functions corresponds to a particular index indexing nodes of a particular node type, wherein the node types comprise user nodes and concept nodes.

26. The media of claim 21, wherein the nodes comprise user nodes and concept nodes, wherein the user nodes correspond to users and the concept nodes correspond to one or more of places, entities, documents, websites, media files, or applications.

27. The media of claim 21, wherein the attributes of the search query and the attributes of the search results are categories associated with the search query and the search results.

* * * * *